United States Patent
Urabe et al.

(10) Patent No.: US 8,675,140 B2
(45) Date of Patent: Mar. 18, 2014

(54) PLAYBACK APPARATUS FOR PLAYING BACK HIERARCHICALLY-ENCODED VIDEO IMAGE DATA, METHOD FOR CONTROLLING THE PLAYBACK APPARATUS, AND STORAGE MEDIUM

(75) Inventors: Hirofumi Urabe, Kawasaki (JP); Atsushi Mizutome, Miura-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 13/114,276

(22) Filed: May 24, 2011

(65) Prior Publication Data

US 2011/0311207 A1 Dec. 22, 2011

(30) Foreign Application Priority Data

Jun. 16, 2010 (JP) ................................. 2010-137677

(51) Int. Cl.
*H04N 5/60* (2006.01)

(52) U.S. Cl.
USPC ...... 348/738; 725/139; 375/240.26; 386/341; 386/355

(58) Field of Classification Search
USPC ................. 386/341, 337, 338, 357, 354, 355; 348/385.1, 387.1, 738; 725/139; 370/240.26
See application file for complete search history.

(56) References Cited

U.S. PATENT DOCUMENTS

| | | | | |
|---|---|---|---|---|
| 4,817,149 A | * | 3/1989 | Myers | 381/1 |
| 4,862,278 A | * | 8/1989 | Dann et al. | 348/240.99 |
| 5,438,623 A | * | 8/1995 | Begault | 381/17 |
| 5,714,997 A | * | 2/1998 | Anderson | 348/39 |
| 5,768,393 A | * | 6/1998 | Mukojima et al. | 381/17 |
| 5,862,229 A | * | 1/1999 | Shimizu | 381/17 |
| 6,078,758 A | * | 6/2000 | Patton et al. | 396/312 |
| 6,185,369 B1 | * | 2/2001 | Ko et al. | 386/344 |
| 6,330,486 B1 | * | 12/2001 | Padula | 700/94 |
| 6,829,017 B2 | * | 12/2004 | Phillips | 348/738 |
| 7,039,113 B2 | * | 5/2006 | Soundararajan | 375/240.25 |
| 7,333,622 B2 | * | 2/2008 | Algazi et al. | 381/310 |
| 7,613,344 B2 | * | 11/2009 | Kim et al. | 382/232 |
| 8,213,648 B2 | * | 7/2012 | Kimijima | 381/310 |
| 2002/0064287 A1 | * | 5/2002 | Kawamura et al. | 381/92 |
| 2002/0071661 A1 | * | 6/2002 | Nakano et al. | 386/96 |
| 2003/0072375 A1 | * | 4/2003 | Soundararajan | 375/240.25 |
| 2007/0110258 A1 | * | 5/2007 | Kimijima | 381/97 |

FOREIGN PATENT DOCUMENTS

| | | | |
|---|---|---|---|
| JP | 352071209 A | * | 6/1977 |
| JP | 09-219858 | | 8/1997 |
| JP | 2004-336430 | | 11/2004 |

* cited by examiner

*Primary Examiner* — David Harvey
(74) *Attorney, Agent, or Firm* — Cowan, Liebowitz & Latman, P.C.

(57) ABSTRACT

Hierarchically-encoded video image data and audio data associated with a predetermined encoded layer of the hierarchically-encoded video image data are received, and the audio-associated encoded layer with which the audio data is associated is specified from among a plurality of encoded layers of the hierarchically-encoded video image data. Then, the ratio of the field of view of a decoded video image of an encoded layer to be played back to the field of view of a decoded video image of the audio-associated encoded layer is calculated. A prestored audio correction amount is multiplied by the calculated ratio, and the resulting new audio correction amount is used to correct the audio data.

26 Claims, 6 Drawing Sheets

| GENRE | TREBLE | BASS | SURROUND |
|---|---|---|---|
| SPORT | 20 | -20 | 20 |
| NEWS | 10 | -10 | 10 |
| MUSIC | 10 | -10 | 20 |

FIG. 8

HIERARCHICALLY-ENCODED VIDEO IMAGE
(FIELD OF VIEW: BASE < ENHANCEMENT 1 < ENHANCEMENT 2)
(RESOLUTION: BASE < ENHANCEMENT 1 < ENHANCEMENT 2)

PLAYBACK APPARATUS FOR PLAYING BACK HIERARCHICALLY-ENCODED VIDEO IMAGE DATA, METHOD FOR CONTROLLING THE PLAYBACK APPARATUS, AND STORAGE MEDIUM

BACKGROUND OF THE INVENTION

1. Field of the Invention

The present invention relates to a technology for playing back hierarchically-encoded video image data in which video images of a plurality of different resolutions or fields of view are hierarchically encoded in a single video stream data as well as audio data associated with a certain encoded layer of the hierarchically-encoded video image data.

2. Description of the Related Art

In recent years, 720×480 pixel or 1440×1080 pixel resolution video images encoded using an MPEG2-Video encoding system have been broadcasted by terrestrial digital broadcasting. Regarding terrestrial digital broadcasting, 320×240 pixel video images encoded using an H.264/AVC (Audio Visual Coding) encoding system have also been broadcasted for mobile phones and other portable devices through a separate stream called one-segment broadcasting.

On the other hand, an H.264/SVC (Scalable Video Coding) technology capable of encoding video images of a plurality of resolutions into a single video stream data has been standardized as an extension of the H.264/AVC. According to the H.264/SVC standard, for example, a plurality of video images of different resolutions, for example, 320×240, 720×480, and 1440×1080 pixel resolutions are hierarchically encoded into a single video stream data as different encoded layers (also referred to as layers). Encoding video images of different resolutions into a single data stream as described above can provide higher compression and transmission efficiency as compared to cases where separate video streams are transmitted.

Moreover, according to the H.264/SVC standard, it is also possible to encode a plurality of video images of different fields of view into a single video stream data. For example, a full-frame video image showing an entire soccer ground and a video image of a specific region showing only a region that includes a soccer player in that full-frame video image are hierarchically encoded into different layers. Then, during playback, the layers are selectively decoded, making it possible to change the field of view of a video image being viewed or to play back a video image suited to the display resolution and the display aspect ratio of the display apparatus.

In this manner, by using the H.264/SVC standard, a plurality of types of display apparatuses can be supported with transmission of only a single video stream data without the need to transmit video through different streams as in the case of terrestrial digital broadcasting and one-segment broadcasting. This means that transmission band efficiency can be increased and services that enable a user to choose a plurality of video image sizes or fields of view can be provided, and therefore, it is envisaged that in the future, hierarchically-encoded video image data compliant with the H.264/SVC standard will be used for television broadcasting.

It should be noted that even in the case of using hierarchically-encoded video image data for television broadcasting, a situation in which only a single audio data stream is provided as in current broadcasting can also be conceived. As described above, the use of hierarchically-encoded video image data enables the user to choose a layer to change the field of view of a video image to be viewed. However, in the case where only a single audio data stream associated with one particular encoded layer is provided, a problem as described below arises. That is, a problem may arise which defies the user's sense of presence when the field of view is changed, because even when the field of view of a video image is changed, the audio stream data to be played back does not change.

Japanese Patent Laid-Open No. 2004-336430 discloses a technology for giving the sense of presence to the user by changing auditory lateralization of the audio in accordance with the clipping size or position of the video image when the field of view has been changed as a result of enlarging a part of a video image.

However, in Japanese Patent Laid-Open No. 2004-336430, playback of video data, such as hierarchically-encoded video image data, in which video images of a plurality of fields of view are hierarchically encoded was not taken into account. In the case where only a single audio data stream associated with one layer (i.e., one field of view) is provided with respect to video stream data in which video images of a plurality of fields of view are hierarchically encoded, it is required to perform processing which are different from cases where video and audio are provided in a one-to-one correspondence. For example, a case where, with respect to a video content of a soccer broadcast, a video image of the entire soccer ground and a video image of a region of interest of the soccer ground are hierarchically encoded in video stream data, and a single audio data stream is associated with the layer of the video image of the region of interest will be considered. In such case, if processing is performed in the same manner as in conventional technologies, assuming that the audio stream is associated with the layer of the video image of the entire soccer ground, unnecessary audio correction processing will be applied when the video image of the region of interest is chosen.

Moreover, there may be a case where hierarchically-encoded video stream data contains a plurality of video images of the same resolution but different fields of view. However, such a case is not taken into account in Japanese Patent Laid-Open No. 2004-336430.

SUMMARY OF THE INVENTION

The present invention has been made in view of problems with conventional technologies, such as the problems described above. The present invention provides audio playback whereby, during playback of hierarchically-encoded video image data and audio data associated with a specific encoded layer of the hierarchically-encoded video image data, the sense of presence is given to the user even in the case where a video image of an encoded layer with which the audio data is not associated is played back.

The present invention in its first aspect provides a playback apparatus that plays back hierarchically-encoded video image data from which decoded video images of individual encoded layers can be obtained by selectively decoding the encoded layers and audio data associated with a predetermined encoded layer of the hierarchically-encoded video image data, the apparatus comprising: a receiving unit configured to receive the hierarchically-encoded video image data and the audio data; a specifying unit configured to specify the audio-associated encoded layer with which the audio data is associated, from among a plurality of encoded layers contained in the hierarchically-encoded video image data received by the receiving unit; an acquiring unit configured to acquire information on a field of view of the decoded video images that can be obtained when the plurality of encoded layers are individually decoded; a video image decoding unit configured to decode a single encoded layer chosen from among the plurality of encoded layers; an audio decoding unit configured to decode the audio data; a correcting unit configured to, in the case where the chosen single encoded layer is not the audio-associated encoded layer, correct an audio decoded by the audio decoding unit using a ratio of the field of view of a decoded video image decoded by the video image decoding unit to the field of view of a decoded video image of the audio-associated encoded layer; and a playback unit configured to play back the decoded video image decoded by the video image decoding unit and the audio corrected by the correcting unit.

The present invention in its second aspect provides a method for controlling a playback apparatus that plays back hierarchically-encoded video image data from which decoded video images of individual encoded layers can be obtained by selectively decoding the encoded layers and audio data associated with a predetermined encoded layer of the hierarchically-encoded video image data, the method comprising: a receiving step of receiving the hierarchically-encoded video image data and the audio data; a specifying step of specifying the audio-associated encoded layer with which the audio data is associated, from among a plurality of encoded layers contained in the hierarchically-encoded video image data received in the receiving step; an acquiring step of acquiring information on a field of view of the decoded video images that can be obtained when the plurality of encoded layers are individually decoded; a video image decoding step decoding a single encoded layer chosen from among the plurality of encoded layers; an audio decoding step of decoding the audio data; a correcting step of, in the case where the chosen single encoded layer is not the audio-associated encoded layer, correcting an audio decoded in the audio decoding step using a ratio of the field of view of a decoded video image decoded in the video image decoding step to the field of view of a decoded video image of the audio-associated encoded layer; and a playback step of playing back the decoded video image decoded in the video image decoding step and the audio corrected in the correcting step.

Further features of the present invention will become apparent from the following description of exemplary embodiments with reference to the attached drawings.

DESCRIPTION OF THE EMBODIMENTS

Hereinafter, a preferred and exemplary embodiment of the present invention will be described in detail with reference to the drawings. In the embodiment below, an example in which the present invention is applied to a set-top box that serves as an example of a playback apparatus which is capable of playing back hierarchically-encoded video image data and audio data associated with a single encoded layer of the hierarchically-encoded video image data will be described. However, the present invention is applicable to any device that is capable of playing back hierarchically-encoded video image data and audio data associated with a predetermined encoded layer of the hierarchically-encoded video image data.

In the present embodiment, as will be described later, an encoded layer ("default_layer") that is contained in the hierarchically-encoded video image data which is to be chosen by default during playback on a playback apparatus is predetermined. In the description below, it is assumed that the audio data is associated with the encoded layer that is to be chosen by default among a plurality of encoded layers of the hierarchically-encoded video image data. As described above, a video image is encoded for each encoded layer, and decoding of a certain encoded layer provides a decoded video image of corresponding resolution and field of view.

In the following description, the H.264/SVC standard is assumed as an example of a hierarchical encoding method. According to this standard, when decoding a certain encoded layer, data of an encoded layer subordinate to the certain encoded layer may be utilized. In the following description, a phrase "decoding a certain encoded layer as the most superordinate layer" assumes a case such as this. However, in the present specification, "decode a certain encoded layer" means ultimately obtaining a decoded video image of that encoded layer, and whether or not data of other encoded layers are used in the process of decoding is irrelevant to the present invention. Therefore, it should be noted that the present invention is not limited to a specific hierarchical encoding method.

In the present embodiment, audio data is associated with a certain encoded layer of the hierarchically-encoded video image data. Moreover, it is assumed that the audio data was recorded at a position corresponding to a video image that is obtained by decoding the encoded layer with which the audio data is associated. That is to say, in the case where audio data is associated with a full size video image captured at a position where the distance to a subject is 50 m, the audio data corresponds to sound that is actually heard by a person at that imaged position (where the distance to the subject is 50 m) when capturing the video image. A full size video image captured at a certain position is equivalent to a video image equivalent to the human field of vision at that position. For example, in the case where a camera captures an image with a lens having a field of view different from the human field of view, such as a telephoto lens, a desirable audio acquired position for recording audio data is a camera position (a converted imaged position) that would have been used, if the captured video image had been captured with a lens having a field of view equivalent to the human field of view. Thus, in the present embodiment, it is assumed that sound recorded at a position 100 m away from the subject is not associated with a decoded video image captured in such a manner that the distance to the subject is equivalent to 10 m. Although it is desirable that the imaged position (including the converted imaged position) and the audio acquired position are the same position, the present embodiment will be described assuming that even when the audio acquired position differs from the imaged position, substantially the same sound as sound that can be heard at the imaged position can be recorded, as long as those positions are at the same distance to the subject.

In the following description, an encoded layer with which the audio data is associated will be referred to as an audio-associated encoded layer and distinguished from an encoded layer with which no audio data is associated. Moreover, in the following description, a data stream containing hierarchically-encoded video image data, audio data, and additional information data will be referred to as content data. It is assumed that information on the field of view or the resolution of a decoded video image that is obtained for each encoded layer can be acquired from the content data.

Figure 1:
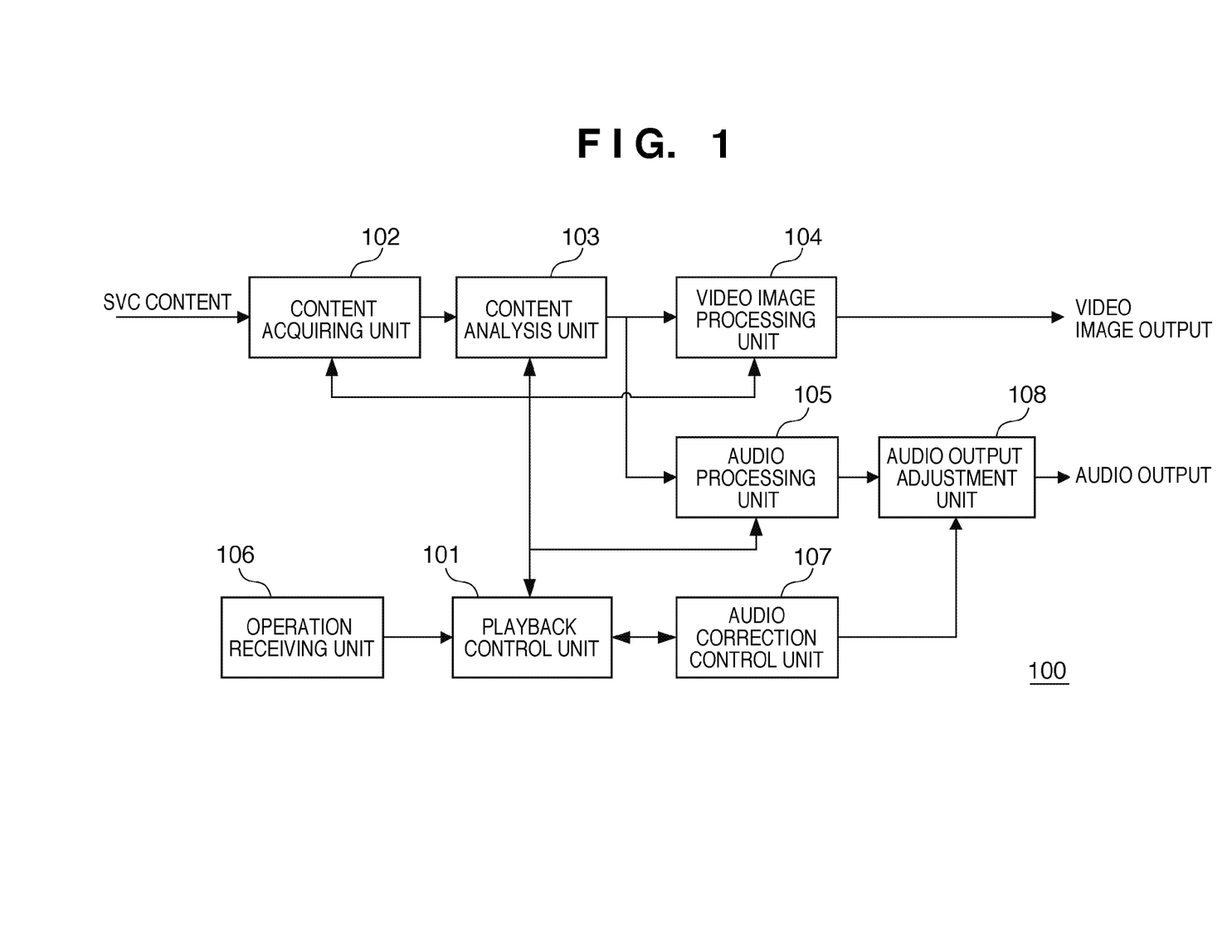
FIG. 1 is a block diagram showing a functional configuration of a set-top box according to an embodiment.

FIG. 1 is a block diagram showing a functional configuration of a set-top box according to an embodiment of the present invention. A set-top box 100 includes a playback control unit 101, a content acquiring unit 102, a content analysis unit 103, a video image processing unit 104, an audio processing unit 105, an operation receiving unit 106, an audio correction control unit 107, and an audio output adjustment unit 108. Content data transmitted via radio wave or a network is input to the set-top box 100 through an antenna input or a network input.

The content acquiring unit 102, based on an instruction from the playback control unit 101, applies demodulation processing and error correction processing to a signal transmitted via radio wave and a network and outputs received content data to the content analysis unit 103.

The content analysis unit 103, based on an instruction from the playback control unit 101, analyzes the content data that has been input from the content acquiring unit 102. Then, the content analysis unit 103 separates hierarchically-encoded video image data, audio data, and additional information data that are multiplexed in the content data. The content analysis unit 103 outputs the separated hierarchically-encoded video image data to the video image processing unit 104, the audio data to the audio processing unit 105, and the additional information data to the playback control unit 101.

The video image processing unit 104, based on a playback instruction from the playback control unit 101, selectively decodes a plurality of encoded layers of the hierarchically-encoded video image data, with an encoded layer designated by the playback instruction regarded as the most superordinate layer, and outputs the resultant decoded video image to an externally connected display apparatus (a display).

The audio processing unit 105, based on a playback instruction from the playback control unit 101, decodes (audio decoding) the audio data that has been separated by the content analysis unit 103 and input to the audio processing unit 105, and outputs the resultant audio to the audio output adjustment unit 108.

The audio output adjustment unit 108, based on an audio output control instruction from the audio correction control unit 107, performs audio quality adjustment with respect to surround, bass, and treble of the audio output by the audio processing unit 105 and processing for correcting auditory lateralization for each audio output channel, such as L and R. Then, the audio output adjustment unit 108 outputs the corrected audio to an externally connected audio output apparatus (a speaker).

The operation receiving unit 106 is, for example, an infrared receiving unit, and receives a user operation signal such as a remote controller signal (key code data) from a remote controller (not shown) that has been operated by the user. Then, the operation receiving unit 106 analyzes the received user operation signal and outputs the content of the operation to the playback control unit 101. Specifically, the operation receiving unit 106 converts the user operation signal to a signal related to playback control, such as the start of playback, information for choosing each layer of the hierarchically-encoded video image data and the like, and outputs the resultant signal to the playback control unit 101.

The playback control unit 101 instructs, in accordance with the playback control signal input from the operation receiving unit 106, the content acquiring unit 102 to receive the content data. Furthermore, the playback control unit 101 instructs the content analysis unit 103 to analyze the content data input from the content acquiring unit 102, and acquires the additional information data that has been analyzed by the content analysis unit 103. Moreover, the playback control unit 101 determines an encoded layer to be decoded, of the hierarchically-encoded video image data, and the audio data in accordance with the additional information data input from the content analysis unit 103 and the playback control signal input from the operation receiving unit 106. Then, the playback control unit 101 instructs the content analysis unit 103 to output a decoded video image to be played back and the audio to the video image processing unit 104 and the audio processing unit 105, respectively. Subsequently, the playback control unit 101 instructs the video image processing unit 104 to play back the decoded video image of the encoded layer that has been determined to be decoded.

Moreover, the playback control unit 101, in accordance with the additional information data input from the content analysis unit 103 and the playback control signal output from the operation receiving unit 106, instructs the audio processing unit 105 to decode and play back the audio data. The playback control unit 101, in accordance with the additional information data input from the content analysis unit 103 and the playback control signal output from the operation receiving unit 106, outputs an audio correction instruction along with the additional information data to the audio correction control unit 107.

The audio correction control unit 107, in accordance with the additional information data and the audio correction instruction input from the playback control unit 101, determines adjustment of audio quality, such as surround, bass, and treble, related to audio playback and the amount of correction of auditory lateralization for each audio output channel, and instructs the audio output adjustment unit 108 to perform audio output adjustment.

Figure 2:
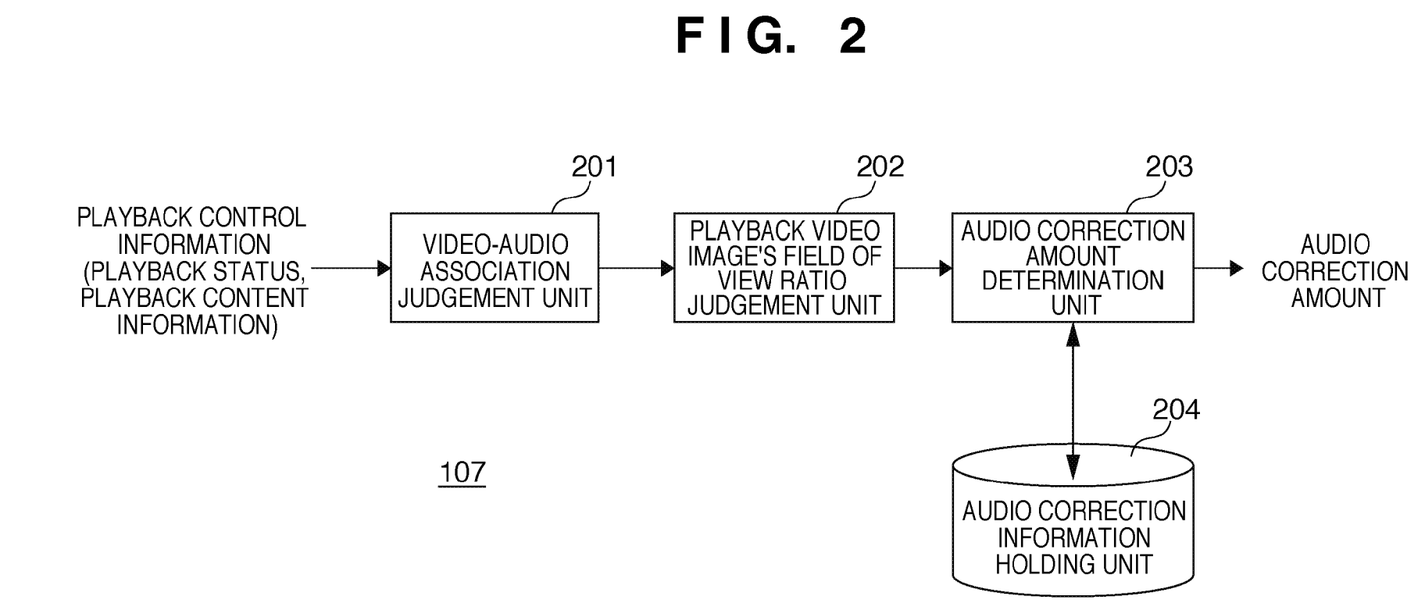
FIG. 2 is a block diagram showing a functional configuration of an audio correction control unit of the set-top box.

Here, processing performed by the audio correction control unit 107 of the set-top box 100 will be described in greater detail using FIG. 2. The audio correction control unit 107 includes a video-audio association judgement unit 201, a playback video image's field of view ratio judgement unit 202, an audio correction amount determination unit 203, and an audio correction information holding unit 204.

Information regarding playback control, such as a playback status and the additional information data containing structural information of each encoded layer of the hierarchically-encoded video image data, is input to the video-audio association judgement unit 201 from the playback control unit 101. The video-audio association judgement unit 201 specifies which encoded layer the audio data is associated with, based on the input structural information of each encoded layer. Then, the video-audio association judgement unit 201 outputs the specified audio-associated encoded layer and information on each encoded layer contained in the additional information data to the playback video image's field of view ratio judgement unit 202.

The playback video image's field of view ratio judgement unit 202 calculates a ratio between fields of view of a decoded video image of the audio-associated encoded layer and a decoded video image of the encoded layer to be played back, and outputs the calculation result to the audio correction amount determination unit 203.

The audio correction amount determination unit 203 determines an audio correction amount for the audio data to be instructed to the audio output adjustment unit 108 using the field of view ratio that has been calculated by the playback video image's field of view ratio judgement unit 202. Specifically, the audio correction amount determination unit 203 references the audio correction information holding unit 204 holding an audio correction information table that is based on genres of content data, and acquires an audio correction amount associated with the genre of the currently received content data. Then, the audio correction amount determination unit 203 multiplies the audio correction amount that has been acquired from the audio correction information holding unit 204 by the field of view ratio to obtain an audio correction amount, and outputs the obtained audio correction amount to the audio output adjustment unit 108.

Figure 3:
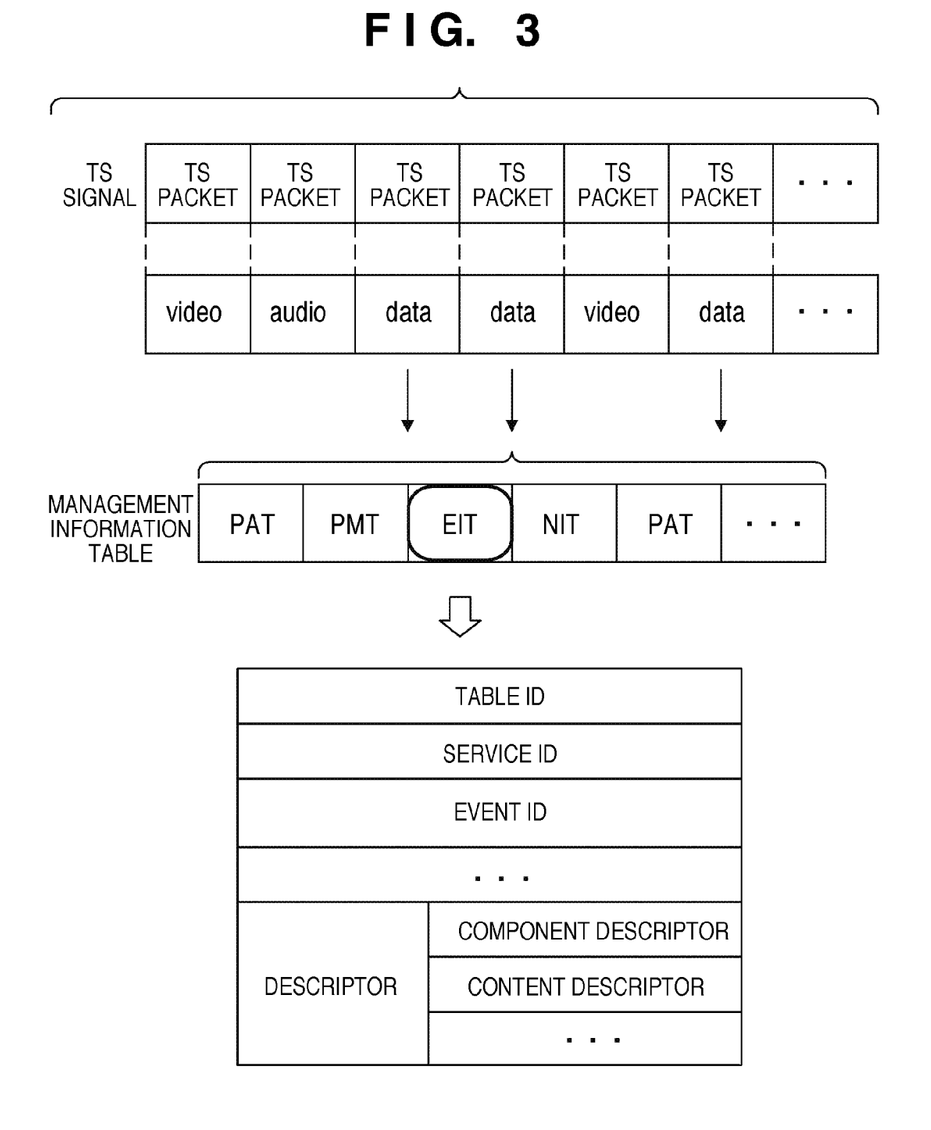
FIG. 3 is a diagram for illustrating the configuration of content data.

FIG. 3 is a diagram showing an example of the configuration of the content data that is output from the content acquiring unit 102 shown in FIG. 1 and that contains the hierarchically-encoded video image data. Here, an example in which the content data is configured as a TS signal defined by the IEC (International Electro-technical Commission), the IEEE (Institute of Electrical and Electronic Engineers), and the like is shown.

As shown in FIG. 3, the signal received by the content acquiring unit 102 contains a plurality of TS packets that are time division multiplexed, forming a TS signal. A "video" portion corresponding to the hierarchically-encoded video image data, an "audio" portion corresponding to the audio data, and a "data" portion corresponding to the additional information data are independently received in TS packet units. The content analysis unit 103 analyzes such TS signal data, separates the TS signal data into the "video" portion, the "audio" portion, and the "data" portion, and outputs the "video" portion to the video image processing unit 104 and the "audio" portion to the audio processing unit 105. Moreover, the content analysis unit 103 outputs the result of analysis of the "video" portion, the "audio" portion, and the "data" portion to the playback control unit 101.

Here, a management information table that is reconstructed by collecting a plurality of "data" portions is composed of a PAT (Program Association Table), a PMT (Program Map Table), an EIT (Event Information Table), an NIT (Network Information Table), and the like. The EIT indicates a program that is currently being received and a subsequent program schedule, and a table ID, a service ID, an event ID, a broadcast start time of the program, a broadcast duration, and the like are described in an initial portion, which is followed by some descriptors.

The content analysis unit 103 performs an analysis of what kind of program is being received based on the information of this EIT. Now, based on the EIT information, basic data (field) information and various types of descriptors, which are related to judgement of whether the currently received content data is a program whose display region can be changed and what kind of display region can be chosen, will be described.

First, the table ID is an information by which the information is identified as the EIT. The program can be identified by the event ID that is described after the table ID. Moreover, a start time and a broadcast duration for each program are described, and it is possible to judge when a program finishes by adding the start time and the duration.

The descriptors contained in the EIT will be described below. Examples of the descriptors include a component descriptor indicating, for example, information on the resolution and the aspect of a video image, a single event descriptor indicating a program name, and an event group descriptor in which event relay information regarding, for example, which service the rest of the program will be broadcasted on is described. In the content descriptor shown in FIG. 3, "news", "sport", "drama", "variety", "education", or the like is described as a program genre.

Figure 4:
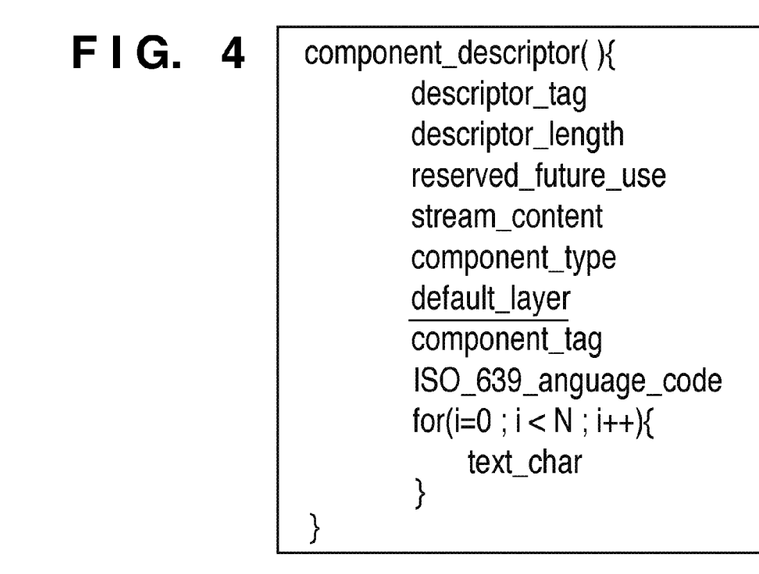
FIG. 4 is a diagram for illustrating a component descriptor.

FIG. 4 is an example of the additional information data in which encoded layer information of the hierarchically-encoded video image data is described using the above-described component descriptor.

Information on the hierarchically-encoded video image data is described in the component descriptor. For example, resolution information, that is, 480i in the case of 0x01 and 1080i in the case of 0xB1, and the like are described in a "component_type" identifier. Moreover, the component descriptor contains a "default_layer" identifier underlined in FIG. 4 as information indicating which encoded layer is to be chosen and decoded by default at the start of playback of the content data. If the value of the "default_layer" identifier is 1, a first encoded layer, that is, a base layer is the encoded layer to be chosen by default. If the value of the "default_layer" identifier is 2, a second encoded layer, that is, a first enhancement layer is the encoded layer to be chosen by default. That is to say, by designating a layer ID in the "default_layer" identifier, it is possible to determine an encoded layer to be initially displayed in the case where there are a plurality of layer structures and a plurality of fields of view in the hierarchically-encoded video image data.

Figure 5:
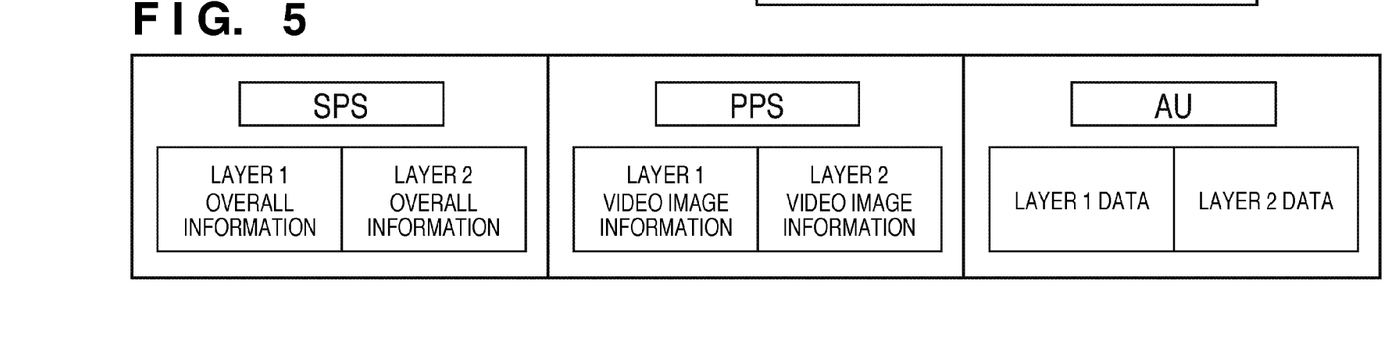
FIG. 5 is a diagram for illustrating additional information data.

Here, the configuration of a hierarchically-encoded video image will be described using FIG. 5. FIG. 5 shows an example of information on encoded layers of hierarchically-encoded video image data compliant with the H.264/SVC standard. The information on the encoded layers is composed of an SPS (Sequence Parameter Set) having information regarding overall encoding, a PPS (Picture Parameter Set) regarding video image encoding, and an AU (Access Unit), which is actual video image data, and the respective pieces of information are subdivided into information for each layer.

In addition to video image resolution information "video_format" of each encoded layer, offset information, that is, "top_offset", "left_offset", "right_offset", and "bottom_offset" are described in the SPS as information on an offset between encoded layers. That is to say, this offset information enables judgement of the difference in the field of view between encoded layers. For example, if each offset value is 10, it is possible to judge that a decoded video image having a field of view larger than that of a reference layer by 10 pixels in each direction of upward, downward, leftward, and rightward can be obtained. It should be noted that the offset information refers to a value representing a position at which, when decoded video images of respective encoded layers are set so that they have the same spatial resolution, a region of the subject expressed in the decoded video image of an encoded layer is displayed in the decoded video image of another encoded layer. That is to say, the offset information is a value representing the position at which a region of the subject expressed in the decoded video image of an encoded layer is displayed in the decoded video image of another encoded layer using the number of pixels from the four sides of the decoded video image of the other encoded layer.

Audio Correction Control Processing

Figure 6:
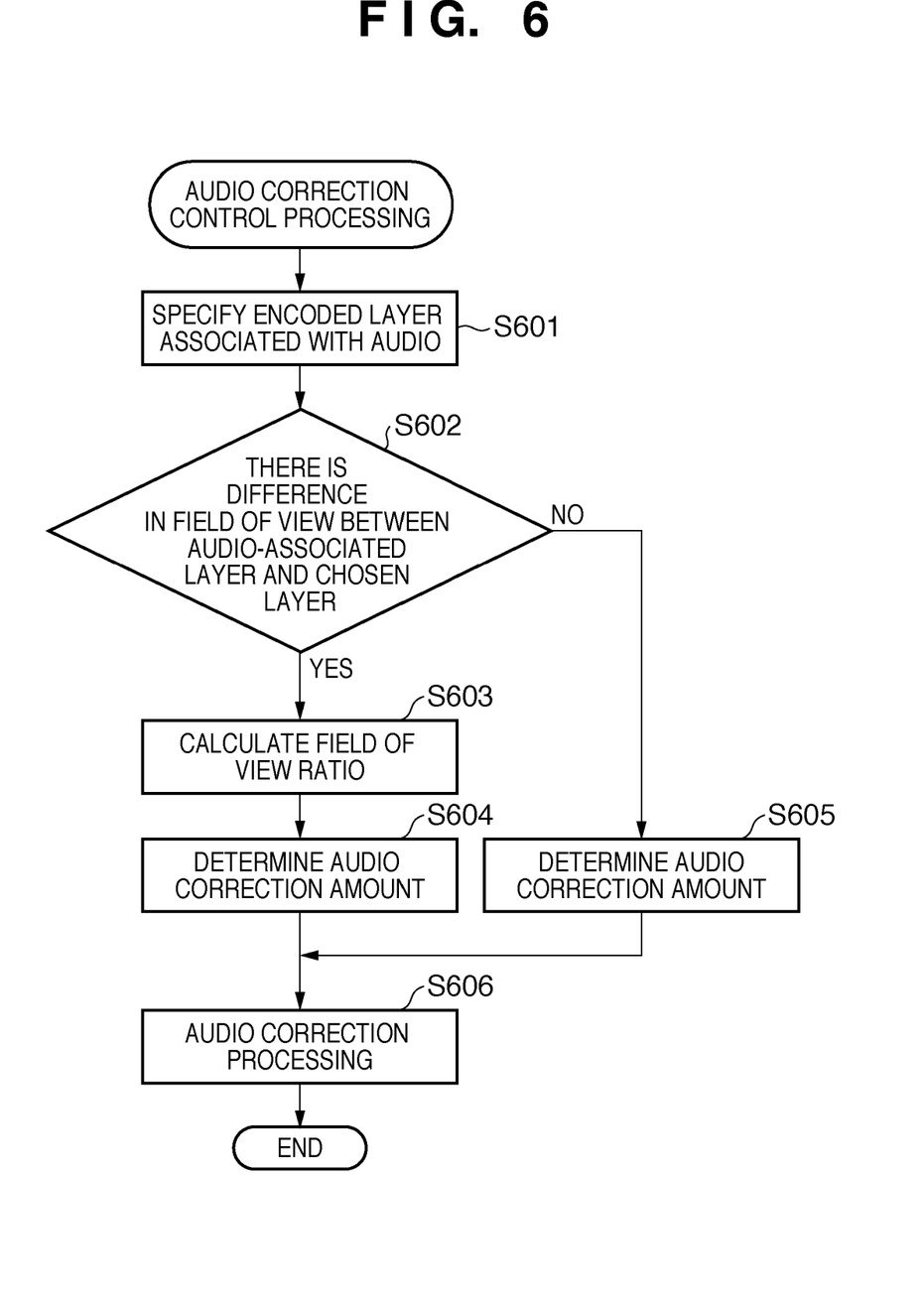
FIG. 6 is a flowchart of audio correction control processing according to the embodiment.

Hereinafter, specific processing of audio correction control processing of the set-top box 100 according to the present embodiment having the configuration as described above will be described using further a flowchart in FIG. 6. The processing corresponding to this flowchart can be realized by the playback control unit 101 reading out a corresponding processing program stored in, for example, a nonvolatile memory (not shown), expanding the program in a RAM (not shown), and executing the program. It should be noted that this audio correction control processing can be started when the operation receiving unit 106 has received a request to start playback of the content data from, for example, a remote controller operated by the user, and the following description is based on the assumption that this audio correction control processing is repeatedly executed during playback of the content data. Specifically, once the content data playback request from the user is input from the operation receiving unit 106, the playback control unit 101 starts playback processing by instructing each block of the set-top box 100 to play back the content data and also starts this audio correction control processing.

In step S601, the playback control unit 101 inputs program information contained in the additional information data of the content data that is being received to the audio correction control unit 107 and causes the audio correction control unit 107 to specify an audio-associated encoded layer with which the audio data contained in the currently received content data is associated. Specifically, the video-audio association judgement unit 201 of the audio correction control unit 107 specifies that the audio data is associated with an encoded layer to be displayed by default from the information of the "default_ layer" described in the component descriptor.

In step S602, the playback control unit 101 judges whether or not there is a difference in the field of view between a decoded video image that is obtained by decoding the audio-associated encoded layer that has been specified by the audio correction control unit 107 and a decoded video image that is obtained by decoding a currently chosen encoded layer. Specifically, the playback control unit 101 makes judgement by referencing the offset information on the offset between layers of the SPS, of the additional information data contained in the content data received from the content analysis unit 103. For example, if at least one of "left_offset", "right_offset", "top_offset", and "bottom_offset", which are the offset information on an offset between the audio-associated encoded layer and the currently chosen encoded layer, takes a value other than 0, the playback control unit 101 judges that there is a change in the field of view. The playback control unit 101 advances the processing to step S603 if there is a difference in the field of view between the decoded video image of the audio-associated encoded layer and the decoded video image of the currently chosen encoded layer, and advances the processing to step S605 if there is no difference.

In step S603, the playback control unit 101 causes the audio correction control unit 107 to calculate the ratio between the fields of view of the respective decoded video images obtained by decoding the encoded layer to be played back and the encoded layer to be displayed by default among a plurality of encoded layers contained in the hierarchically-encoded video image data. Specifically, the playback control unit 101 causes the audio correction control unit 107 to calculate the ratio between the fields of view of the decoded video image obtained by decoding the audio-associated encoded layer and the decoded video image obtained by decoding the encoded layer to be played back.

First, the playback video image's field of view ratio judgement unit 202 of the audio correction control unit 107 acquires, from the additional information data of the audio-associated encoded layer and the encoded layer to be played back, the fields of view of the respective decoded video images that is obtained when these encoded layers are decoded. Then, the playback video image's field of view ratio judgement unit 202 calculates the field of view ratio from the information on the fields of view of the audio-associated encoded layer and the encoded layer to be played back. In the present embodiment, the field of view ratio is not a ratio between the resolutions of the respective decoded video images, but is defined as the square root of the ratio between the areas of display regions in the case where the decoded video images are converted so that they have the same spatial resolution. Moreover, since the field of view ratio is used for audio adjustment, if the field of view ratio is a number smaller than 1, a negative reciprocal of the field of view ratio is defined as the field of view ratio. For example, if the calculated field of view ratio is ½ times, the playback video image's field of view ratio judgement unit 202 outputs "−1/ (½)=−2" to the audio correction amount determination unit 203 as the field of view ratio.

Figure 8:
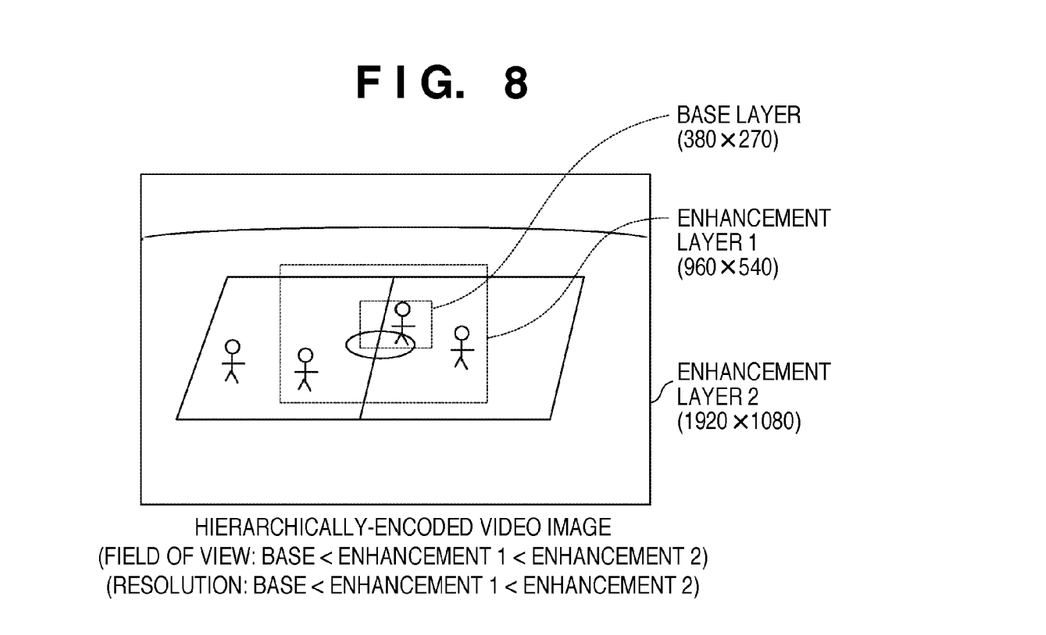
FIG. 8 is a diagram for illustrating decoded video images expressed by individual encoded layers of hierarchically-encoded video image data.

Here, a specific example of the method for calculating the field of view ratio will be described using FIG. 8. The example in FIG. 8 shows a positional relationship among decoded video images in the case where encoded layers of hierarchically-encoded video image data that have a base layer compatible with the H.264/AVC standard and two enhancement layers serving as superordinate layers that are extensions of the base layer have been decoded. In the present embodiment, it is assumed that decoded video images obtained by decoding encoded layers all have the same spatial resolution.

First, the offset information on the offset between layers of the SPS, of the additional information data contained in the content data is referenced. It is assumed that in the case where the component descriptor describes that the "default_layer" is an enhancement layer 1 and the encoded layer that is currently chosen to be played back is an enhancement layer 2, the offset information of the enhancement layer 2 with respect to the enhancement layer 1 is as follows:

left_offset: 480
right_offset: 480
top_offset: 270
bottom_offset: 270

At this time, since display resolution of the decoded video image of the enhancement layer 1 is 960×540, the ratios of vertical and horizontal resolutions of the decoded video image of the enhancement layer 2 to those of the enhancement layer 1 serving as a reference are:

$$\frac{\text{horizontal resolution of enhancement layer 1} + \text{left\_offset} + \text{right\_offset}}{\text{horizontal resolution of enhancement layer 1}} = \frac{960 + 480 + 480}{960} = 2$$

$$\frac{\text{vertical resolution of enhancement layer 1} + \text{top\_offset} + \text{bottom\_offset}}{\text{vertical resolution of enhancement layer 1}} = \frac{540 + 270 + 270}{540} = 2$$

Consequently, the ratio between the areas of display regions is 2×2=4 times. The ratio of the field of view of the enhancement layer 2 to that of the enhancement layer 1 is calculated as the square root and found to be 2 times.

Figure 7:
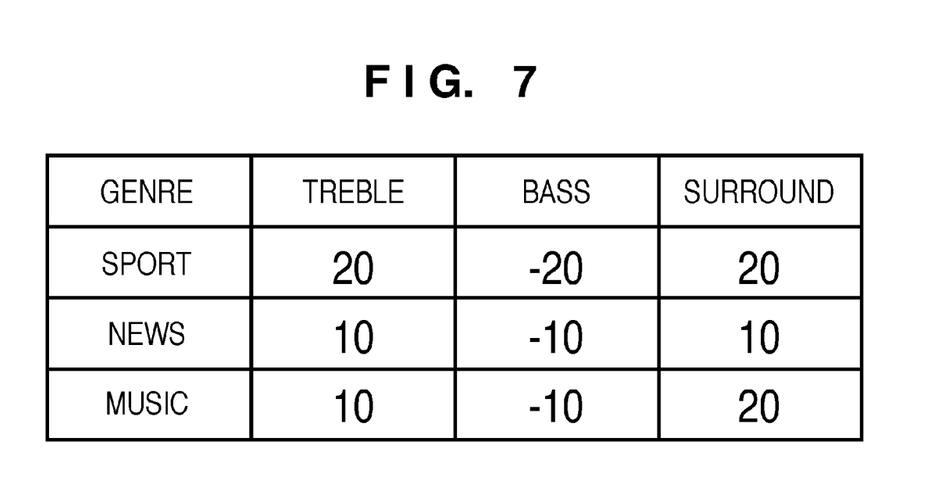
FIG. 7 is a diagram showing an example of the configuration of an audio correction amount information table.

In step S604, the playback control unit 101 causes the audio correction control unit 107 to determine the audio correction amount appropriate for the genre of the content data that is being received and the decoded video image of the currently chosen encoded layer. Specifically, first, the audio correction amount determination unit 203 of the audio correction control unit 107 acquires an audio correction amount associated with the genre of the currently received content data from the audio correction amount information table held by the audio correction information holding unit 204. The information on the genre of the content data is acquired from the content descriptor contained in the additional information data of the received content data. FIG. 7 shows an example of the audio correction amount information table, and the audio correction information holding unit 204 holds audio correction amounts regarding treble, bass, and surround (spatial impression of sound) for each genre of content data as an audio correction information table. The audio correction amount determination unit 203 of the audio correction control unit 107 multiplies the audio correction amounts of the respective parameters associated with the content data that is being received by the field of view ratio calculated in step S603, thereby deciding audio correction amounts that reflect the difference in the field of view.

For example, a case where, as shown in FIG. 8, the content data is a soccer broadcast (the genre is "sport"), the audio-associated encoded layer is the enhancement layer 1, and the currently chosen encoded layer to be played back is the enhancement layer 2 will be considered.

The enhancement layer 2 has a wider field of view than the enhancement layer 1, and a soccer ground is viewed from far away. Therefore, audio associated with the decoded video image of the enhancement layer 2 has a smaller effect of giving the sense of presence than audio in the center of the soccer ground of the enhancement layer 1. Specifically, processing for correcting the audio so that the volume of a bass portion such as the sound of a ball bouncing in the soccer ground decreases, the volume of a treble portion such as the sound of an audience or the sound traveling throughout the soccer ground increases, and the spatial impression of sound is improved. That is to say, the audio correction amounts of respective adjustment parameters acquired from the audio correction amount information table are multiplied by the field of view ratio (2 times) calculated in step S603, and the treble portion: 20%×2 times=40%,
the bass portion: −20%×2 times=−40%, and
the surround: 20%×2 times=40% are the finally determined audio correction amounts.

Even in the case where there is no difference in the field of view between the decoded video image of the audio-associated encoded layer and the decoded video image of the currently chosen encoded layer, in step S605, the playback control unit 101 causes the audio correction control unit 107 to determine the audio correction amounts appropriate for the genre of the content data. It should be noted that since it is not necessary to perform audio correction that reflects the difference in the field of view in this step, the audio correction amount determination unit 203 of the audio correction control unit 107 can use the audio correction amounts associated with the genre of the content data, which have been acquired from the audio correction information holding unit 204, as the audio correction amounts as they are.

Then, in step S606, the playback control unit 101 causes the audio output adjustment unit 108 to apply correction to the audio decoded by the audio processing unit 105 using the audio correction amounts that have been determined by the audio correction control unit 107. The corrected audio is output from an audio playback apparatus, such as a speaker, connected to the set-top box 100 from the audio output adjustment unit 108.

It should be noted that in the present embodiment, an audio correction method that uses the audio correction amounts obtained by multiplying the audio correction amounts associated with the genre of the content data by the ratio of the field of view of the decoded video image of the currently chosen encoded layer to the field of view of the decoded video image of the audio-associated encoded layer has been described. However, according to the present invention, it is also possible to create the sense of presence of audio due to a difference in the field of view by simply multiplying the audio by the field of view ratio without using the audio correction amounts associated with the genre of the content data.

Moreover, the above embodiment has been described assuming that the audio data was recorded at a position corresponding to a decoded video image that is obtained by decoding the encoded layer with which the audio data is associated. However, according to the present invention, in a case where there is a difference between the distance from the position at which the audio data was recorded to the subject and the distance from the imaged position corresponding to the video image obtained by decoding the encoded layer with which the audio data is associated to the subject can also be supported. That is to say, in the case where there is a difference between the imaged position and the audio acquired position, correction processing for correcting sound localization so that the audio sounds as if it were recorded at the imaged position can be performed as processing preliminary to the processing of the above-described embodiment. With this correction processing, the audio is first corrected so that the audio sounds like as being recorded at the imaged position, and then, the control described in the above embodiment can be applied to the corrected audio data. Although there is no need to mention here, there have been many techniques for correcting sound localization or an acoustic image for a long time, and so a correction technique suitable in carrying out the present invention can be applied.

Moreover, in the above-described embodiment, adjustment has been performed with respect to the treble, bass, and surround of the audio. However, it is also possible to judge a shift of auditory lateralization based on an offset value between video image layers and correct the auditory lateralization in accordance with the shift.

Moreover, in the above embodiment, a case where the content data contains one audio data set associated with one encoded layer has been described in order to facilitate understanding and description. However, the present invention is not limited to the case where there is only one audio data set and is applicable to a case where the content data provides no audio data associated with an encoded layer to be played back. For example, in the case where two audio data sets are provided, an audio data set associated with an encoded layer having a field of view closer to the field of view of the decoded video image of the encoded layer to be played back can be used.

Moreover, the above embodiment has been described assuming that the audio-associated encoded layer with which the audio data is associated is the encoded layer to be played back by default, which is described in the additional information data contained in the content data. However, implementation of the present invention is not limited to the case where the audio-associated encoded layer is described in the additional information data, and it is also possible to determine the audio-associated encoded layer from, for example, the information of each encoded layer of the hierarchically-encoded video image data. For example, in the case of such content data that a full-frame video image and a video image obtained by clipping a predetermined region of the full-frame video image are hierarchically encoded, an encoded layer into which the full-frame video image is encoded may be determined as the audio-associated encoded layer. In other words, out of a plurality of encoded layers of the hierarchically-encoded video image data, an encoded layer from which a decoded video image having the widest field of view can be obtained may be used as the audio-associated encoded layer. That is to say, since the hierarchically-encoded video image data is composed of full-frame video images that have been captured at a single imaged position, the audio-associated encoded layer may be determined based on judgement that such content data contains audio data recorded at an acquired position corresponding to the single imaged position.

As described above, the playback apparatus of the present embodiment is capable of audio data playback that gives the sense of presence to the user by correcting audio data associated with a predetermined encoded layer of hierarchically-encoded video image data so as to suit the field of view of a decoded video image of an encoded layer to be play back. Specifically, the playback apparatus receives hierarchically-encoded video image data and audio data associated with a predetermined encoded layer of the hierarchically-encoded video image data. Furthermore, the playback apparatus specifies the audio-associated encoded layer with which the audio data is associated, from among a plurality of encoded layers of the hierarchically-encoded video image data. Then, the ratio of the field of view of a decoded video image of an encoded layer to be played back to the field of view of a decoded video image of the audio-associated encoded layer is calculated. Furthermore, a prestored audio correction amount is multiplied by the calculated ratio to obtain a new audio correction amount, and the new audio correction amount is used to correct the audio data.

In this manner, even in the case where no audio is associated with a chosen encoded layer, an audio giving the sense of presence suited to the chosen encoded layer can be presented to the user.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-137677, filed Jun. 16, 2010, which is hereby incorporated by reference herein in its entirety.

What is claimed is:

1. A playback apparatus that plays back hierarchically-encoded video image data from which decoded video images of individual encoded layers can be obtained by selectively decoding the encoded layers and audio data associated with a predetermined encoded layer of the hierarchically-encoded video image data, the apparatus comprising:
at least one processor; and
a memory which is coupled to the at least one processor and stores instructions which cause the at least one processor to perform operations of following units of the playback apparatus:
a receiving unit which receives the hierarchically-encoded video image data and the audio data;
a specifying unit which specifies the audio-associated encoded layer with which the audio data is associated, from among a plurality of encoded layers contained in the hierarchically-encoded video image data received by the receiving unit;
an acquiring unit which acquires information on a field of view of the decoded video images that can be obtained when the plurality of encoded layers are individually decoded;
a video image decoding unit which decodes a encoded layer chosen from among the plurality of encoded layers;
an audio decoding unit which decodes the audio data;
a correcting unit which, in the case where the chosen encoded layer is not the audio-associated encoded layer, corrects an audio decoded by the audio decoding unit using a ratio of the field of view of a decoded video image decoded by the video image decoding unit to the field of view of a decoded video image that can be obtained when the audio-associated encoded layer is decoded; and
a playback unit which plays back the decoded video image decoded by the video image decoding unit and the audio corrected by the correcting unit.

2. The playback apparatus according to claim 1, further comprising a storage unit which stores an audio correction amount for correcting the audio,
wherein the correcting unit corrects the audio with a correction amount obtained by multiplying the audio correction amount by the field of view ratio.

3. The playback apparatus according to claim 2, wherein the memory further storing an instruction which causes the at least one processor to perform operations of an identifying unit of the playback apparatus which identifies a genre of a content of the hierarchically-encoded video image data,
wherein the storage unit stores an audio correction amount associated with a genre, and
the correcting unit corrects the audio using the audio correction amount associated with the genre identified by the identifying unit.

4. The playback apparatus according to claim 1, wherein the decoding unit uses a result of decoding an encoded layer, among the plurality of encoded layers, different from the chosen encoded layer to decode the chosen encoded layer.

5. A method for controlling a playback apparatus that plays back hierarchically-encoded video image data from which decoded video images of individual encoded layers can be obtained by selectively decoding the encoded layers and audio data associated with a predetermined encoded layer of the hierarchically-encoded video image data, the method comprising:
receiving the hierarchically-encoded video image data and the audio data;
specifying the audio-associated encoded layer with which the audio data is associated, from among a plurality of encoded layers contained in the hierarchically-encoded video image data received in the receiving;
acquiring information on a field of view of the decoded video images that can be obtained when the plurality of encoded layers are individually decoded;
decoding an encoded layer chosen from among the plurality of encoded layers;
decoding the audio data;
in the case where the chosen encoded layer is not the audio-associated encoded layer, correcting an audio decoded in the audio decoding using a ratio of the field of view of a decoded video image decoded in the video image decoding to the field of view of a decoded video image that can be obtained when the audio-associated encoded layer is decoded; and playing back the decoded video image decoded in the video image decoding and the audio corrected in the correcting.

6. A non-transitory computer-readable storage medium storing a computer-executable program for causing a computer to perform each step of the method for controlling the playback apparatus according to claim 5.

7. The method according to claim 5, further comprising storing an audio correction amount for correcting the audio, wherein, in the correcting, the audio with a correction amount obtained by multiplying the audio correction amount by the field of view ratio is corrected.

8. The method according to claim 7, further comprising identifying a genre of a content of the hierarchically-encoded video image data, wherein, in the storing, an audio correction amount associated with a genre is stored, and in the correcting, the audio using the audio correction amount associated with the genre identified in the identifying is corrected.

9. The method according to claim 5, wherein, in the decoding, a result of decoding an encoded layer, among the plurality of encoded layers, different from the chosen encoded layer to decode the chosen encoded layer is used.

10. A video image processing apparatus comprising:
at least one processor; and
a memory which is coupled to the at least one processor and stores instructions which cause the at least one processor to perform operations of following units of the video image processing apparatus:
a receiving unit which receives hierarchically-encoded video image data, from which decoded video images of individual encoded layers can be obtained by selectively decoding the encoded layers, and audio data associated with a predetermined encoded layer of the hierarchically-encoded video image data;
a first decoding unit which decodes a encoded layer chosen from a plurality of encoded layers contained in the hierarchically-encoded video image data;
a second decoding unit which decodes audio data;
an acquiring unit which acquires information on a field of view of a decoded video that can be obtained when the plurality of encoded layers are individually decoded; and
a correcting unit which, in the case where audio data is not associated with the chosen encoded layer decoded by the first decoding unit, corrects an audio decoded by the second decoding unit based on information on the field of view of a decoded video image that can be obtained when an encoded layer, with which audio data is associated, is decoded and information on the field of view of the chosen encoded layer decoded by the first decoding unit.

11. The video image processing apparatus according to claim 10, wherein the correcting unit corrects, in a case where audio data is not associated with the chosen encoded layer decoded by the first decoding unit, the audio decoded by the second decoding unit based on a ratio of the field of view of the decoded video image that can be obtained when the encoded layer, with which audio data is associated, is decoded and the field of view of the chosen encoded layer decoded by the first decoding unit.

12. The video image processing apparatus according to claim 11, further comprising a storage unit which stores an audio correction amount for correcting the audio, wherein the correcting unit corrects the audio with a correction amount obtained by multiplying the audio correction amount by the field of view ratio.

13. The video image processing apparatus according to claim 12, wherein the memory further storing an instruction which causes the at least one processor to perform operations of an identifying unit of the playback apparatus which identifies a genre of a content of the hierarchically-encoded video image data, wherein the storage unit stores an audio correction amount associated with a genre, and the correcting unit corrects the audio using the audio correction amount associated with the genre identified by the identifying unit.

14. The video image processing apparatus according to claim 10, wherein the first decoding unit uses a result of decoding an encoded layer, among the plurality of encoded layers, different from the chosen encoded layer to decode the chosen encoded layer.

15. The video image processing apparatus according to claim 10, wherein the correcting unit corrects at least treble, bass, surround, or auditory lateralization of the audio.

16. The video image processing apparatus according to claim 10, wherein the correcting unit corrects, in a case where a plurality of layers each associated with audio data are included in the plurality of encoded layers, the audio data associated with a layer that a decoded video image, which can be obtained when the layer is decoded, has a field of view closer to the field of view of the chosen encoded layer decoded by the first decoding unit.

17. The video image processing apparatus according to claim 10, wherein the audio data is associated with an encoded layer, of which a decoded video image, that can be obtained when the encoded layer is decoded, has the widest field of view, of the plurality of encoded layers.

18. A method for controlling a video image processing apparatus comprising:
receiving hierarchically-encoded video image data, from which decoded video images of individual encoded layers can be obtained by selectively decoding the encoded layers, and audio data associated with a predetermined encoded layer of the hierarchically-encoded video image data;
decoding a encoded layer chosen from a plurality of encoded layers contained in the hierarchically-encoded video image data;
decoding audio data;
acquiring information on a field of view of a decoded video that can be obtained when the plurality of encoded layers are individually decoded; and
in the case where audio data is not associated with the chosen encoded layer decoded in the first decoding, correcting an audio decoded in the second decoding based on information on the field of view of a decoded video image that can be obtained when an encoded layer, with which audio data is associated, is decoded and information on the field of view of the chosen encoded layer decoded in the first decoding.

19. The method according to claim 18, wherein, in the correcting, in a case where audio data is not associated with the chosen encoded layer decoded in the first decoding, the audio decoded in the second decoding is corrected based on a ratio of the field of view of the decoded video image that can be obtained when the encoded layer, with which audio data is associated, is decoded and the field of view of the chosen encoded layer decoded in the first decoding.

20. The method according to claim 19, further comprising storing an audio correction amount for correcting the audio,
wherein, in the correcting, the audio with a correction amount obtained by multiplying the audio correction amount by the field of view ratio is corrected.

21. The method according to claim 20, further comprising identifying a genre of a content of the hierarchically-encoded video image data,
wherein, in the storing, an audio correction amount associated with a genre is stored, and
in the correcting, the audio using the audio correction amount associated with the genre identified in the identifying is corrected.

22. The method according to claim 18, wherein, in the first decoding, a result of decoding an encoded layer, among the plurality of encoded layers, different from the chosen encoded layer to decode the chosen encoded layer is used.

23. The method according to claim 18, wherein, in the correcting, at least treble, bass, surround, or auditory lateralization of the audio is corrected.

24. The method according to claim 18, wherein, in the correcting, in a case where a plurality of layers each associated with audio data are included in the plurality of encoded layers, the audio data associated with a layer, that a decoded video image, which can be obtained when the layer is decoded, has a field of view closer to the field of view of the chosen encoded layer decoded in the first decoding, is corrected.

25. The method according to claim 18, wherein the audio data is associated with an encoded layer, of which a decoded video image, that can be obtained when the encoded layer is decoded, has the widest field of view, of the plurality of encoded layers.

26. A non-transitory computer-readable storage medium storing a computer-executable program for causing a computer to perform each step of the method for controlling the video image processing apparatus according to claim 18.

* * * * *